US008713456B2

(12) United States Patent
Hernandez et al.

(10) Patent No.: US 8,713,456 B2
(45) Date of Patent: Apr. 29, 2014

(54) ESTABLISHING A GRAPHICAL USER INTERFACE ('GUI') THEME

(75) Inventors: Sergio A. Hernandez, Durham, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1219 days.

(21) Appl. No.: 12/121,297

(22) Filed: May 15, 2008

(65) Prior Publication Data

US 2009/0288023 A1    Nov. 19, 2009

(51) Int. Cl.
*G06F 3/00* (2006.01)

(52) U.S. Cl.
USPC ........................................ 715/762

(58) Field of Classification Search
USPC .......... 345/606, 608, 611; 382/162, 164, 165, 382/166, 168, 170, 171, 172, 276, 260, 298, 382/589, 593, 608, 611; 715/762, 763, 273, 715/275, 276
See application file for complete search history.

(56) References Cited

U.S. PATENT DOCUMENTS

| | | | |
|---|---|---|---|
| 7,073,130 B2 | 7/2006 | Novak et al. | |
| 7,242,988 B1 | 7/2007 | Hoffberg et al. | |
| 2004/0054542 A1* | 3/2004 | Foote et al. | 704/500 |
| 2005/0246627 A1* | 11/2005 | Sayed | 715/513 |
| 2006/0200751 A1* | 9/2006 | Underwood et al. | 715/501.1 |
| 2006/0206811 A1 | 9/2006 | Dowdy | |
| 2007/0035706 A1* | 2/2007 | Margulis | 353/122 |
| 2007/0192164 A1 | 8/2007 | Nong et al. | |
| 2007/0214422 A1 | 9/2007 | Agarwal et al. | |
| 2009/0327927 A1* | 12/2009 | De Leon et al. | 715/763 |

OTHER PUBLICATIONS

Pero Obrador, "Automatic color scheme picker for document templates based on image analysis and dual problem", 2006, "HPL-2006-10.pdf" 11 pages.*
Solar, "Theme Creator Pro", http://tcpro.lasyk.net/ [online], 2002, [accessed online Oct. 27, 2011], URL:http://tcpro.lasyk.net/, 2 pp.

* cited by examiner

*Primary Examiner* — Haoshian Shih
(74) *Attorney, Agent, or Firm* — Brandon C. Kennedy; Katherine S. Brown; Biggers Kennedy Lenart Spraggins LLP

(57) ABSTRACT

Methods, apparatus, and products for establishing a graphical user interface ('GUI') theme, including: receiving, by a GUI theme creator, a media file including one or more digital images, the one or more digital images including a plurality of pixels, the plurality of pixels representing a plurality of colors, the plurality of pixels organized for display at a resolution and an aspect ratio; identifying, by the GUI theme creator, one or more characteristics of the media file; and creating, by the GUI theme creator, a GUI theme in dependence upon the characteristics of the media file.

17 Claims, 3 Drawing Sheets

ESTABLISHING A GRAPHICAL USER INTERFACE ('GUI') THEME

BACKGROUND OF THE INVENTION

1. Field of the Invention

The field of the invention is data processing, or, more specifically, methods, apparatus, and products for establishing a graphical user interface ('GUI') theme.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have graphical user interfaces that enable a human user to interact with and control the computer system. Such graphical user interfaces are made up of many discrete components such toolbars, buttons, windows, scroll bars and the like. Current methods of assigning colors to those components include manual assignment of one color to each component. Moreover, digital images and digital videos contain many colors that could be used to derive a color scheme for the components of a graphical user interface, but current processes of such a derivation is manual, time consuming, and inefficient.

SUMMARY OF THE INVENTION

Methods, apparatus, and products for establishing a graphical user interface ('GUI') theme, including: receiving, by a GUI theme creator, a media file including one or more digital images, the one or more digital images including a plurality of pixels, the plurality of pixels representing a plurality of colors, the plurality of pixels organized for display at a resolution and an aspect ratio; identifying, by the GUI theme creator, one or more characteristics of the media file; and creating, by the GUI theme creator, a GUI theme in dependence upon the characteristics of the media file.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
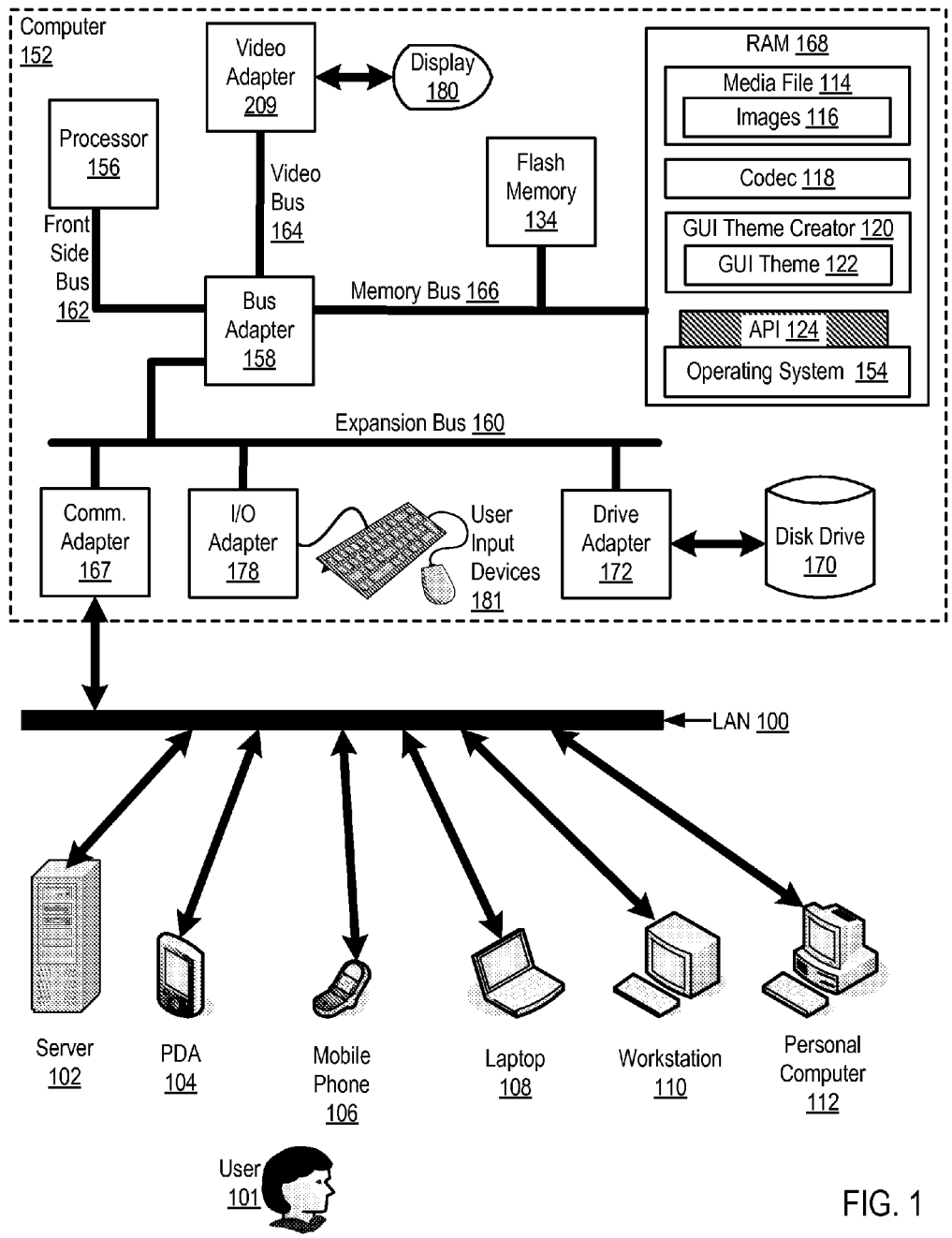
FIG. 1 sets forth a functional block diagram of an exemplary system for establishing a GUI theme according to embodiments of the present invention.

Exemplary methods, apparatus, and products for establishing a GUI theme accordance with the present invention are described with reference to the accompanying drawings, beginning with FIG. 1. FIG. 1 sets forth a functional block diagram of an exemplary system for establishing a GUI theme (122) according to embodiments of the present invention. A GUI is a type of user (101) interface which allows a user (101) to interact with a computer and computer-controlled devices. The GUI presents GUI components such as graphical icons, visual indicators, or other graphical elements. Icons may be used in a GUI in conjunction with text, labels, or text navigation to represent the information and actions available to a user (101). Instead of offering only text menus, or requiring typed commands, the actions are usually performed through direct manipulation of the graphical components.

A GUI theme (122) as the term is used in this specification is a data structure that includes information describing display properties of one or more GUI components. A GUI theme (122) may be applied by a particular software application such as a word processor, a digital media player, a spreadsheet application, and the like as a skin on the typical GUI provided by the application. A 'skin' as the term is used in this specification is a custom graphical appearance of an application's typical GUI. A GUI theme (122) may also be applied by an operating system to system wide, OS GUI components. Example in of OS GUI components include tool bars, menu bars, menu text, window backgrounds, window text, and so on as will occur to those of skill in the art.

The display properties of GUI components described by the information included in a GUI theme (122) may apply to one particular GUI component, a class of GUI components, or a combination of GUI components. Examples of display properties that may apply to one particular GUI component or a class of GUI components include display colors, such as menu bar colors, text colors, window background colors, and so on. Examples of display properties that may apply to a combination of components include display resolution, anti-aliasing methods, trilinear interpolation techniques, brightness, contrast, image sharpening, gamma settings, and the like that are enabled for a computer display when the GUI theme (122) is applied. The term 'color' is used throughout this specification to refer to the visual perception of light by a human eye as well as to the values that are a digital representation of such visual perception of light capable of being displayed on a computer display.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a GUI theme creator (120), a set of computer program instructions that establishes a GUI theme (122) according to embodiments of the present invention by receiving a media file (114), identifying, by the GUI theme creator (120), one or more characteristics of the media file (114); and creating, by the GUI theme creator (120), a GUI theme (122) in dependence upon the characteristics of the media file (114). The GUI theme creator (120) in the example of FIG. 1 is implemented as a standalone set of computer program instructions stored in RAM (168) but readers of skill in the art will recognize that such a GUI theme creator (120) may also be implemented as a software component of an operating system.

The GUI theme creator (120) in the example of FIG. 1, may receive a media file (114) from the user (101) through one of the computers (102,104,106,108,110,112) and the data communications network (100). In fact, a GUI theme may be created by the GUI theme creator (120) for any application or operating system of any of the computers connecting the user (101) to the computer (152). Consider, as just one example, the mobile phone (106). Many mobile phones today include a digital camera which can capture digital images. With such a mobile phone connected to the computer (152) through the data communications network (100), a user may capture a digital image, transmit the digital image to the computer (152) where the GUI creator receives the digital image, the media file (114), identifies one or more characteristics of the digital image, and creates a GUI theme for the mobile phone or an application executed on the mobile phone (106). In such a configuration, the computer (152) functions as a server in a client-server relationship where the computer (152) provides the service of GUI theme creation for clients.

A media file (114) is digital representation of media content, such as audio, video, text, and so on. Examples of media file formats include Joint Photographic Experts Group ('JPEG'), Graphics Interchange Format ('GIF'), Moving Picture Experts Group-2 ('MPEG-2'), MPEG-4, Ogg, and so on as will occur to those of skill in the art. In the example of FIG. 1, the media file (114) includes one or more digital images (116). Such a media file (114) may include a digital video made up of many frames where each frame is a digital image, or such a media file (114) may be a single digital image.

A digital image is digital representation of a two-dimensional image. Each of the digital images (116) in the example of FIG. 1 include a plurality of pixels. A pixel as the term is used in the specification refers to a picture element, the smallest individual element in an image. Such a pixel is implemented as a value represents a particular color and its brightness at a location in the image. Digital images (116) include many rows and columns of such pixels which are organized for display at a particular resolution and an aspect ratio. Resolution of a digital image as the used in the specification refers to the number of pixels per area unit in the image, such as pixels per square inch. Aspect ratio as the term is used in this specification refers to the dimensions of an image, which may be expressed as a ratio such as 16×9 or 4×3 with respect to digital video media files, or expressed in terms of pixels, such as 1280×720, with respect to a single digital image.

Characteristics of the media file (114) may include any property of the image file useful in establishing a GUI theme (122). Such properties may include dominant colors of the images (116) of the media file (114), an aspect ratio of the pixels of the images (116) of the media file (114), resolution of the images (116), and so on as will occur to those of skill in the art. Identifying, by the GUI theme creator (120), one or more such characteristics of the media file (114) may be carried out by determining a type of the media file (114); decoding the media file (114) through use of a codec (118) if the media file (114) is encoded, scanning, in dependence upon the media file (114) type, predefined portions of the media file (114); and extracting the one or more characteristics from the predefined portions. A codec (118) is a device or program capable of encoding and/or decoding a digital data stream or signal. The word 'codec' may be a combination of any of the following: 'compressor-decompressor,' 'coder-decoder,' or 'compression/decompression algorithm.' Examples of video codecs include MPEG-1 Part 2, MPEG-2 Part 2, H.264, MPEG-4 Part 2, DivX, Xvid, Theora, Windows Media Video ('WMV') and so on as will occur to those of skill in the art.

Also stored in RAM (168) is an operating system (154). Operating systems useful for establishing a GUI theme (122) according to embodiments of the present invention include UNIX™, Linux™, Microsoft XP™, Microsoft Vista™, AIX™, IBM's i5/OS™, and others as will occur to those of skill in the art. As mentioned above, the GUI theme creator (120) may be implemented as a standalone set of computer program instructions stored in RAM (168) or as a software component of the operating system (154). If the GUI theme creator (120) is implemented as a standalone set of computer program instructions stored in RAM (168), the operating system may expose an application program interface ('API') (124) to the GUI theme creator (120) to enable the GUI theme create an OS GUI theme (122). That is, in creating a GUI theme (122) for the operating system, the GUI theme creator (120) may assign colors to components of an OS GUI theme (122), set a computer display to a particular aspect ratio, enable anti-aliasing, enable trilinear interpolation, and the like, all through an API (124) exposed to the GUI theme creator (120) by the operating system (154). Although the operating system (154), GUI theme creator (126), codec (118), and media files (114), in the example of FIG. 1, are shown in RAM (168), but many components of such software typically are stored in non-volatile memory also, such as, for example, on a disk drive (170) or in flash memory (134).

The computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that establish a GUI theme (122) according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory) (134), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with a data communications network (100) and other computers, such as the server (102), personal digital assistant ('PDA') (104), mobile phone (106), laptop (108), workstation (110), personal computer (112). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for establishing a GUI theme (122) according to embodiments of the present invention include modems for wired dial-up communications, Ethernet (IEEE 802.3) adapters for wired data communications network communications, and 802.11 adapters for wireless data communications network communications.

The arrangement of servers, computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
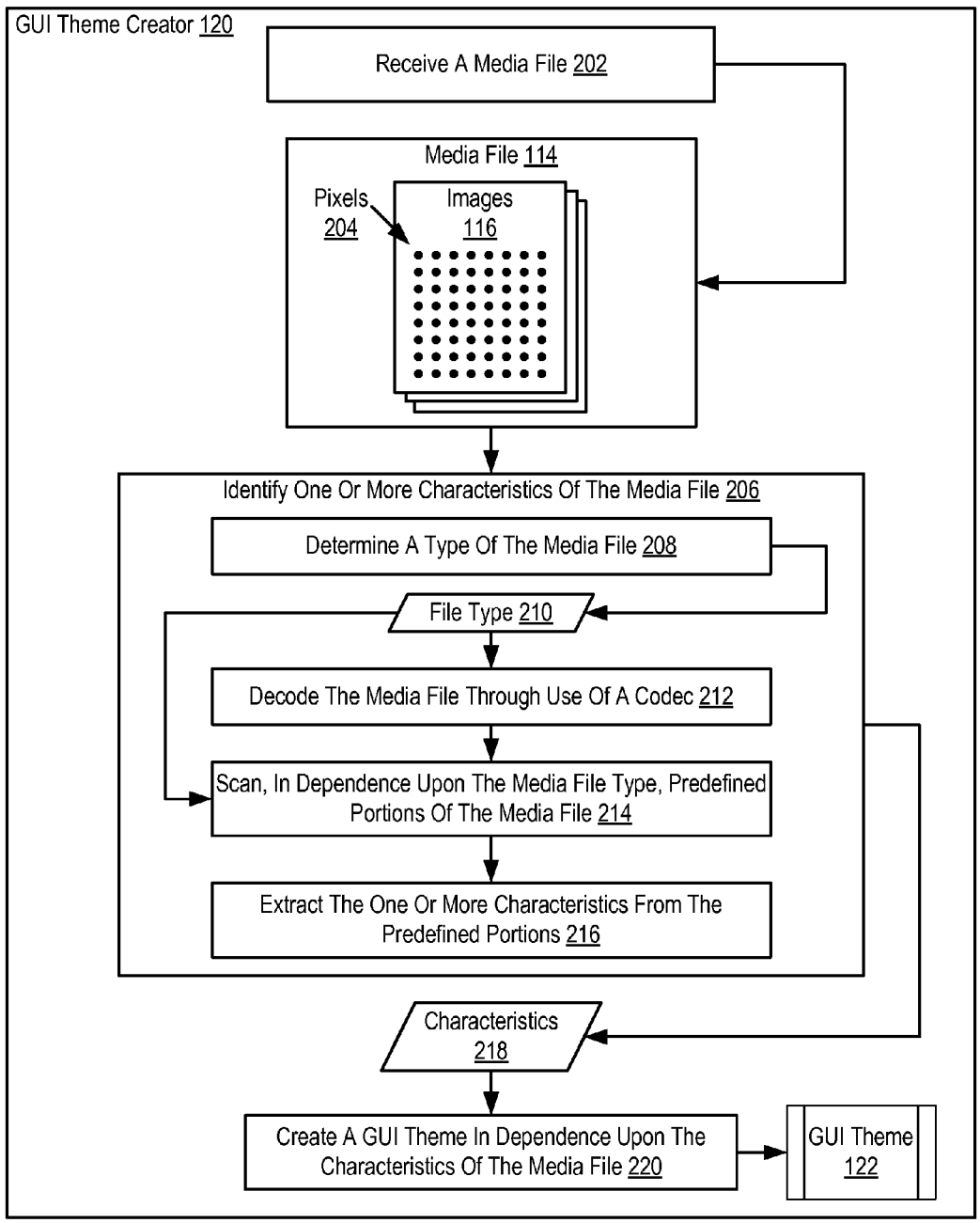
FIG. 2 sets forth a flow chart illustrating an exemplary method for establishing a GUI theme according to embodiments of the present invention.

For further explanation, FIG. 2 sets forth a flow chart illustrating an exemplary method for establishing a GUI theme (122) according to embodiments of the present invention. The method of FIG. 2 includes receiving (202), by a GUI theme creator (120), a media file (114). In the method of FIG. 2, the media file (114) includes one or more digital images (116) with the one or more digital images (116) including a plurality of pixels (204). The plurality of pixels (204) represent a plurality of colors and are organized for display at a resolution and an aspect ratio.

Receiving (202), by a GUI theme creator (120), a media file (114) may be carried out by receiving from a user a memory location of the media file (114) in a computer system in which the GUI theme creator is executing, or by receiving the media file (114) from a user through a client computer and a data communications network connecting the client computer and the computer system in which the GUI theme creator is executing in a client-server relationship.

The method of FIG. 2 also includes identifying (206), by the GUI theme creator (120), one or more characteristics (218) of the media file (114). In the method of FIG. 2 identifying (206) one or more characteristics (218) of the media file (114) is carried out by determining (208) a type of the media file (114); decoding (212) the media file (114) through use of a codec if the media file is encoded; and extracting (214), from predefined portions of the media file, in dependence upon the media file type (210), the one the one or more characteristics (218).

Determining (208) a type of the media file (114) may be carried out by determining the file type from a file extension, such as 'jpg,' 'mp4,' 'mov,' and the like, determining the file type from a header of the file itself, and in other ways as will occur to those of skill in the art. Different media file types (210) include one or more different predefined portions, such as a header, a footer, a start of frame, an end of frame, and so on. Extracting (214), from such predefined portions of the media file, in dependence upon the media file type (210), the one the one or more characteristics (218) may be carried out by scanning the media file for the predefined portions, typically identified by a particular binary code, and copying values from the predefined portions. Such values may include aspect ratios, a resolution, dimensions of an image, and so on. In the case of a JPEG, for example, a predefined portion may be a start of frame that indicates the height, width and number of components, that is, a number of pixels, in the frame. Other predefined portions may include fields of metadata describing the media file. Such metadata may be implemented as an ID3 tag for example.

The method of FIG. 2 also includes creating (220), by the GUI theme creator (120), a GUI theme (122) in dependence upon the characteristics (218) of the media file (114). Creating (220), by the GUI theme creator (120), a GUI theme (122) in dependence upon the characteristics (218) of the media file (114) may be carried out by assigning, in the GUI theme, display values to one or more GUI theme components. Such display values may represent colors assigned to particular GUI theme components, computer display resolutions assigned to a GUI theme, graphics processing techniques such as trilinear interpolation and anti-aliasing, assigned to a GUI theme, and so on as will occur to those of skill in the art.

Figure 3:
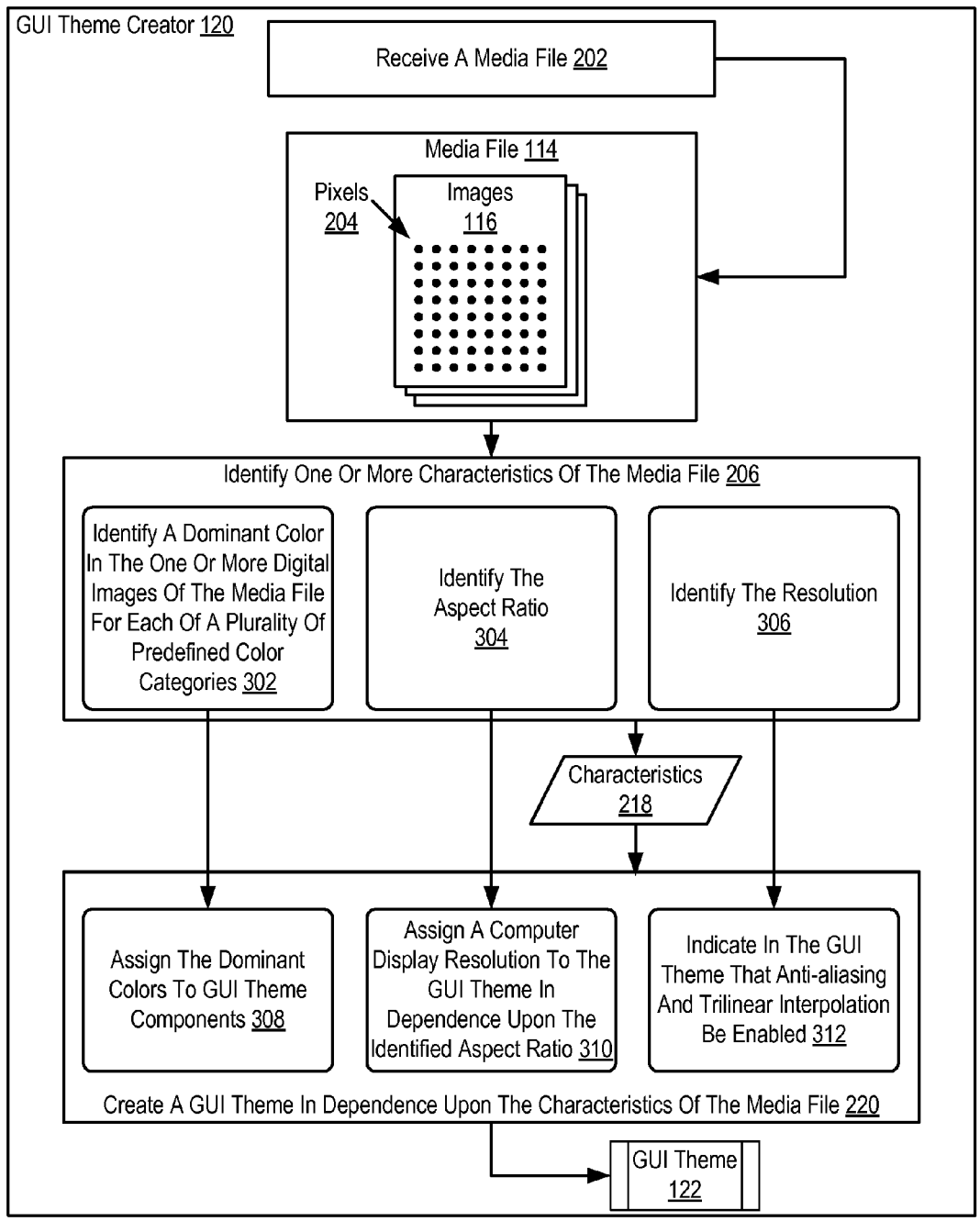
FIG. 3 sets forth a flow chart illustrating a further exemplary method for establishing a GUI theme according to embodiments of the present invention.

For further explanation, FIG. 3 sets forth a flow chart illustrating a further exemplary method for establishing a GUI theme according to embodiments of the present invention. The method of FIG. 3 is similar to the method of FIG. 2 in that the method of FIG. 2 also includes receiving (202) a media file (114); identifying (206) one or more characteristics (218) of the media file (114); and creating (220) a GUI theme (122) in dependence upon the characteristics (218) of the media file (114).

The method of FIG. 3 differs from the method of FIG. 2, however, in that, in the method of FIG. 3, identifying (206), by the GUI theme creator (120), one or more characteristics (218) of the media file (114) includes identifying (302) a dominant color in the one or more digital images (116) of the media file (114) for each of a plurality of predefined color categories and creating (220), by the GUI theme creator (120), a GUI theme (122) in dependence upon the characteristics (218) of the media file (114) includes assigning (308) the dominant colors to GUI theme components. A predefined color category defines a group of colors of different shades of the same base color. Such predefined color categories may include, for example, reds, oranges, yellows, greens, blues, and violets. A dominant color in a predefined color category may be a particular shade of the predefined color category having the largest number of occurrences in the media file (114). Assigning (308) the dominant colors to GUI theme components may be carried out by associating, in a data structure, each GUI theme component with a predefined color category. Consider the following table as an example table of a GUI theme in which dominant colors are assigned to GUI theme components.

TABLE 1

| GUI Theme In Which Dominant Colors Are Assigned To GUI Theme Components ||
| --- | --- |
| RedsColorCategory | CD5C5C |
| OrangesColorCategory | FF4500 |
| YellowsColorCategory | FFD700 |
| GreensColorCategory | 006400 |
| BluesColorCategory | 4682B4 |
| PurplesColorCategory | 800080 |
| GraysColorCategory | DCDCDC |
| GUIComp__Toolbar | RedsColorCategory |
| GUIComp__Scrollbar | OrangesColorCategory |
| GUIComp__WindowBackground | YellowsColorCategory |
| GUIComp__MousePointer1 | GreensColorCategory |
| GUIComp__MousePointer2 | BluesColorCategory |
| GUIComp__WindowText | BluesColorCategory |

In the example Table 1 above there are seven predefined color categories, one each for reds, oranges, yellows, greens, blues, purples, and grays. Each color category has been assigned a dominant color identified in the media file (114).

The colors in the example of Table 1 are depicted as a combination of a three pairs of hexadecimal digits, sometimes referred to as an RGB triplet where each pair of hexadecimal digits specifies an intensity for its corresponding color. That is, the first pair of hexadecimal digits specifies an intensity of red, the second specifies an intensity for green, and the third specifies an intensity for blue. This is just one example of a representation of a particular color. Readers of skill in the art will recognize that each color may be represented with other values specifying such attributes as hue, saturation, and luminance, and like.

Also in the example of Table 1, GUI components, including the toolbar, scrollbar, window background, a first and second mouse pointer, and window text are assigned to particular categories. The toolbar is assigned to the reds color category, the scrollbar to the oranges, window background to the yellows, the first mouse pointer to the greens, the second mouse pointer to the blues, and the window text to the blues. Changing the values of a dominant color of a color category changes the color of any GUI component assigned to that color category. Readers of skill in the art will immediately recognize that Table 1 is only an example of a GUI theme including a few GUI components but GUI themes established according to embodiments of the present invention may include many more GUI components. With such a GUI theme that includes a large number of GUI components, each assigned to a predefined color category, making changes to the colors of many GUI components may be carried out by changing a relatively few number of values, the values of dominant colors. That is, by changing only the values of the dominant colors a GUI theme creator may change colors of a relatively large number of GUI components.

Assigning (308) the dominant colors to GUI theme components may also include assigning a negative of one of the dominant colors to one or more GUI theme component or assigning an average of two or more of the dominant colors to one or more GUI theme components. Assigning a negative of one of the dominant colors to one or more GUI theme component may be carried out by determining a value of the negative of the dominant color and assigning that value to a predefined color category. Such an assignment of a negative of the dominant color to a predefined color category may be useful for assigning a color for textual GUI components displayed on a background having a dominant color. Consider a menu bar for example that is assigned a dominant color of solid black. In such a case, it may be useful for human visual perception, that is, contrast, to assign the negative of the dominant color, white, to menu bar text. Assigning an average of two or more of the dominant colors to one or more GUI theme components may be carried out by determining a value of the average and associating that value with a predefined color category. An average of two dominant colors may be useful for GUI components located near components of the two dominant colors, such that the visual contrast between the components of the two dominant colors and the GUI components of the average of the two dominant colors is reduced.

Also in the method of FIG. 3, identifying (206), by the GUI theme creator, one or more characteristics of the media file includes identifying (304) the aspect ratio and creating (220) a GUI theme (122) in dependence upon the characteristics (218) of the media file (114) includes assigning (310) a computer display resolution to the GUI theme in dependence upon the identified aspect ratio. Computer display resolution, and its synonym display resolution, as the terms are used in this specification refer to the number of distinct pixels in each dimension that can be displayed on the computer display. Examples of typical display resolutions include 1680×1050, 1280×720, 1024×768 and so on as will occur to those of skill in the art.

Assigning (310) a computer display resolution to the GUI theme in dependence upon the identified aspect ratio may be carried out by identifying from a list of associated aspect ratios and display resolutions, a computer display resolution for the aspect ratio of the media file and storing the identified computer display resolution in the GUI theme, that is, in a field of a record of the GUI theme data structure designated for storing values of display resolutions. Examples of associated aspect ratios and display resolutions may include, an aspect ratio of 16×9 and a display resolution of 1280×720, an aspect ratio of 4×3 and a display resolution of 1024×768, an aspect ratio of 4×3 and a display resolution of 800×600, and so on.

Also in the method of FIG. 3, identifying (206), by the GUI theme creator (120), one or more characteristics (218) of the media file (114) includes identifying (306) the resolution and creating (306), by the GUI theme creator (120), a GUI theme (122) in dependence upon the characteristics (218) of the media file (114) includes indicating in the GUI theme (122) that anti-aliasing and trilinear interpolation graphics processing be enabled for a computer display if the resolution of the media file is greater than a predetermined threshold. Anti-aliasing is aliasing is a technique of minimizing distortion artifacts known as aliasing when representing a high-resolution signal at a lower resolution. Anti-aliasing is used in digital photography, computer graphics, digital audio, and many other applications. Trilinear interpolation is a texture mapping technique in which a trilinear interpolation algorithm used. The term trilinear refers to the performing of interpolations in three dimensions, horizontal, vertical, and depth. A trilinear interpolation algorithm is an algorithm for multivariate interpolation of a 3-dimensional grid of discretely sampled data. The trilinear interpolation algorithm approximates the value of an intermediate point within the local axial rectangular prism linearly, using data on the lattice points. Trilinear interpolation algorithms are frequently used in numerical analysis, data analysis, and computer graphics. Consider the following table as an example of a GUI theme that includes an indication that anti-aliasing and trilinear interpolation graphics processing be enabled for a computer display.

TABLE 2

GUI Theme That Includes An Indication That Anti-Aliasing And Trilinear Interpolation Graphics Processing Be Enabled For A Computer Display

| | |
|---|---|
| Anti-aliasing | True |
| Trilinear_Interpolation | True |
| RedsColorCategory | CD5C5C |
| OrangesColorCategory | FF4500 |
| YellowsColorCategory | FFD700 |
| GreensColorCategory | 006400 |
| BluesColorCategory | 4682B4 |
| PurplesColorCategory | 800080 |
| GraysColorCategory | DCDCDC |
| GUIComp_Toolbar | RedsColorCategory |
| GUIComp_Scrollbar | OrangesColorCategory |
| GUIComp_WindowBackground | YellowsColorCategory |
| GUIComp_MousePointer1 | GreensColorCategory |
| GUIComp_MousePointer2 | BluesColorCategory |
| GUIComp_WindowText | BluesColorCategory |

The example of Table 2 is similar to the example of Table 1 in that Table 2 includes dominant colors assigned to color categories and GUI components assigned to color categories.

The example of Table 2 differs from the example of Table 1, however, in that Table 2 includes an indication that anti-aliasing be enabled for a computer display. Such indication is depicted in Table 2 as a value of "True," but readers of skill in the art will immediately recognize that any value, 1, Enabled, Yes, and so on may be used in GUI themes established according to embodiments of the present invention to indicate that anti-aliasing is to be enabled. The example of Table 2 also differs from the example of Table 1 in that Table 2 includes an indication that trilinear interpolation be enabled for the computer display. Such indication, like the indication with respect to anti-aliasing, is depicted in Table 2 as a value of "True," but readers of skill in the art will immediately recognize that, like the indication with respect to anti-aliasing, any value, 1, Enabled, Yes, and so on may be used in GUI themes established according to embodiments of the present invention to indicate that trilinear interpolation is to be enabled.

Exemplary embodiments of the present invention are described largely in the context of a fully functional computer system for establishing a GUI theme. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of establishing a graphical user interface ('GUI') theme, the method comprising:
   receiving, by a GUI theme creator, a media file comprising one or more digital images, the one or more digital images comprising a plurality of pixels, the plurality of pixels representing a plurality of colors, the plurality of pixels organized for display at a resolution and an aspect ratio;
   identifying, by the GUI theme creator, one or more characteristics of the media file, comprising
      identifying a dominant color in the one or more digital images of the media file for each of a plurality of predefined color categories, and
      creating, by the GUI theme creator, a GUI theme in dependence upon the characteristics of the media file further comprises assigning the dominant colors to GUI theme components; and
   creating, by the GUI theme creator for a GUI, a GUI theme in dependence upon the characteristics of the media file, wherein the GUI does not comprise a website.

2. The method of claim 1 wherein identifying one or more characteristics of the media file further comprises:
   determining a type of the media file;
   decoding the media file through use of a codec if the media file is encoded; and
   extracting, from predefined portions of the media file, in dependence upon the media file type, the one the one or more characteristics.

3. The method of claim 1 wherein assigning the dominant colors to GUI theme components further comprises:
   assigning a negative of one of the dominant colors to one or more GUI theme components.

4. The method of claim 1 wherein assigning the dominant colors to GUI theme components further comprises:
   assigning an average of two or more of the dominant colors to one or more GUI theme components.

5. The method of claim 1 wherein:
   identifying, by the GUI theme creator, one or more characteristics of the media file further comprises identifying the aspect ratio; and
   creating, by the GUI theme creator, a GUI theme in dependence upon the characteristics of the media file further comprises assigning a computer display resolution to the GUI theme in dependence upon the identified aspect ratio.

6. The method of claim 1 wherein:
   identifying, by the GUI theme creator, one or more characteristics of the media file further comprises identifying the resolution; and
   creating, by the GUI theme creator, a GUI theme in dependence upon the characteristics of the media file further comprises indicating in the GUI theme that anti-aliasing and trilinear interpolation graphics processing be enabled for a computer display if the resolution of the media file is greater than a predetermined threshold.

7. An apparatus for establishing a graphical user interface ('GUI') theme, the apparatus comprising a computer processor, a computer memory operatively coupled to the computer processor, the computer memory having disposed within it computer program instructions capable of:
   receiving, by a GUI theme creator, a media file comprising one or more digital images, the one or more digital images comprising a plurality of pixels, the plurality of pixels representing a plurality of colors, the plurality of pixels organized for display at a resolution and an aspect ratio;
   identifying, by the GUI theme creator, one or more characteristics of the media file, comprising
      identifying a dominant color in the one or more digital images of the media file for each of a plurality of predefined color categories, and
      creating, by the GUI theme creator, a GUI theme in dependence upon the characteristics of the media file further comprises assigning the dominant colors to GUI theme components; and
   creating, by the GUI theme creator for a GUI, a GUI theme in dependence upon the characteristics of the media file, wherein the GUI does not comprise a website.

8. The apparatus of claim 7 wherein identifying one or more characteristics of the media file further comprises:

determining a type of the media file;

decoding the media file through use of a codec if the media file is encoded; and extracting, from predefined portions of the media file, in dependence upon the media file type, the one the one or more characteristics.

9. The apparatus of claim 7 wherein assigning the dominant colors to GUI theme components further comprises:

assigning a negative of one of the dominant colors to one or more GUI theme components.

10. The apparatus of claim 7 wherein assigning the dominant colors to GUI theme components further comprises:

assigning an average of two or more of the dominant colors to one or more GUI theme components.

11. The apparatus of claim 7 wherein:

identifying, by the GUI theme creator, one or more characteristics of the media file further comprises identifying the aspect ratio; and creating, by the GUI theme creator, a GUI theme in dependence upon the characteristics of the media file further comprises assigning a computer display resolution to the GUI theme in dependence upon the identified aspect ratio.

12. The apparatus of claim 7 wherein:

identifying, by the GUI theme creator, one or more characteristics of the media file further comprises identifying the resolution; and creating, by the GUI theme creator, a GUI theme in dependence upon the characteristics of the media file further comprises indicating in the GUI theme that anti-aliasing and trilinear interpolation graphics processing be enabled for a computer display if the resolution of the media file is greater than a predetermined threshold.

13. A computer program product for establishing a graphical user interface ('GUI') theme, the computer program product disposed in a computer readable medium, the computer program product comprising computer program instructions capable of:

receiving, by a GUI theme creator, a media file comprising one or more digital images, the one or more digital images comprising a plurality of pixels, the plurality of pixels representing a plurality of colors, the plurality of pixels organized for display at a resolution and an aspect ratio;

identifying, by the GUI theme creator, one or more characteristics of the media file, comprising identifying a dominant color in the one or more digital images of the media file for each of a plurality of predefined color categories, and creating, by the GUI theme creator, a GUI theme in dependence upon the characteristics of the media file further comprises assigning the dominant colors to GUI theme components; and creating, by the GUI theme creator for a GUI, a GUI theme in dependence upon the characteristics of the media file, wherein the GUI does not comprise a website.

14. The computer program product of claim 13 wherein identifying one or more characteristics of the media file further comprises:

determining a type of the media file;

decoding the media file through use of a codec if the media file is encoded; and extracting, from predefined portions of the media file, in dependence upon the media file type, the one the one or more characteristics.

15. The computer program product of claim 13 wherein assigning the dominant colors to GUI theme components further comprises:

assigning a negative of one of the dominant colors to one or more GUI theme components.

16. The computer program product of claim 13 wherein:

identifying, by the GUI theme creator, one or more characteristics of the media file further comprises identifying the aspect ratio; and creating, by the GUI theme creator, a GUI theme in dependence upon the characteristics of the media file further comprises assigning a computer display resolution to the GUI theme in dependence upon the identified aspect ratio.

17. The computer program product of claim 13 wherein:

identifying, by the GUI theme creator, one or more characteristics of the media file further comprises identifying the resolution; and creating, by the GUI theme creator, a GUI theme in dependence upon the characteristics of the media file further comprises indicating in the GUI theme that anti-aliasing and trilinear interpolation graphics processing be enabled for a computer display if the resolution of the media file is greater than a predetermined threshold.

* * * * *